(12) United States Patent
Zhang

(10) Patent No.: US 8,608,511 B2
(45) Date of Patent: Dec. 17, 2013

(54) CARD CONNECTOR ALTERNATIVELY RECEIVING TWO CARDS

(75) Inventor: Wei-De Zhang, Shenzhen (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 31 days.

(21) Appl. No.: 13/472,819

(22) Filed: May 16, 2012

(65) Prior Publication Data

US 2012/0295481 A1 Nov. 22, 2012

(51) Int. Cl.
*H01R 24/00* (2011.01)

(52) U.S. Cl.
USPC .................................................. 439/630

(58) Field of Classification Search
USPC ............. 439/630, 631, 326, 328, 159, 65, 21; 361/737, 752; 257/678
See application file for complete search history.

(56) References Cited

U.S. PATENT DOCUMENTS

| | | | |
|---|---|---|---|
| 5,933,328 A * | 8/1999 | Wallace et al. ............... | 361/737 |
| 6,193,557 B1 * | 2/2001 | Luvini et al. .................. | 439/630 |
| 6,869,302 B2 * | 3/2005 | Bricaud et al. ............... | 439/326 |
| 6,896,548 B2 * | 5/2005 | Scuteri et al. ............. | 439/541.5 |
| 7,059,912 B2 * | 6/2006 | Tsai ............................. | 439/630 |
| 7,083,473 B1 * | 8/2006 | Lai ............................... | 439/630 |
| 7,309,259 B2 * | 12/2007 | Sun et al. ...................... | 439/630 |
| 7,322,838 B1 * | 1/2008 | Chen et al. ................... | 439/159 |
| 7,326,085 B2 * | 2/2008 | Takai et al. ................... | 439/630 |
| 7,351,109 B2 * | 4/2008 | Wang ........................... | 439/631 |
| 7,357,643 B1 * | 4/2008 | Chen et al. ...................... | 439/65 |
| 7,390,204 B2 * | 6/2008 | Tanaka et al. ................ | 439/159 |
| 7,442,044 B2 * | 10/2008 | Yang et al. ...................... | 439/64 |
| 7,448,889 B1 * | 11/2008 | Ho et al. ........................ | 439/159 |
| 7,452,241 B2 * | 11/2008 | Kikuchi et al. ............... | 439/630 |
| 7,618,273 B1 * | 11/2009 | Wang et al. ................... | 439/159 |
| 7,670,188 B2 | 3/2010 | Zhang et al. | |
| 7,976,327 B2 * | 7/2011 | Matsumoto et al. .......... | 439/326 |
| 8,107,246 B2 * | 1/2012 | Fidalgo et al. ............... | 361/737 |
| 8,157,596 B1 * | 4/2012 | Little et al. .................... | 439/630 |
| 8,282,404 B1 * | 10/2012 | Little et al. ...................... | 439/95 |
| 8,337,223 B2 * | 12/2012 | Gao et al. ..................... | 439/159 |
| 8,337,239 B2 * | 12/2012 | Holmes ........................ | 439/483 |
| 2002/0076954 A1 * | 6/2002 | Chen et al. .................. | 439/76.1 |
| 2003/0081388 A1 * | 5/2003 | Yang ............................. | 361/737 |
| 2005/0003711 A1 * | 1/2005 | Chang .......................... | 439/630 |
| 2005/0196994 A1 * | 9/2005 | Bilcauu et al. ............... | 439/326 |

FOREIGN PATENT DOCUMENTS

CN 201197025 2/2009

\* cited by examiner

*Primary Examiner* — Alexander Gilman
(74) *Attorney, Agent, or Firm* — Ming Chieh Chang; Wei Te Chung

(57) ABSTRACT

A card connector (100) includes an insulative housing (1), a number of contacts (2) retained in the insulative housing, a metal shell (5) covering the insulative housing for defining a first space, and a pair of spring elements (3, 4) associating with the insulative housing and the metal shell for defining a second space. The insulative housing defines a pair of cavities (13, 14) and having a flange (133, 143) extending into each cavity. The spring elements have fixing portions (31, 41) retained with the insulative housing, front and rear flexible beams (32, 33, 42, 43) oppositely extending from the fixing portions, and first, second, third, and fourth floating portions (34, 35, 44, 45) formed on respective distal ends of the front and rear flexible beams. The floating portions protrude into the first space. Each floating portion has a protrusion (341, 351, 441, 451) suspending below the flange.

9 Claims, 9 Drawing Sheets

CARD CONNECTOR ALTERNATIVELY RECEIVING TWO CARDS

BACKGROUND OF THE INVENTION

1. Field of the Invention

The present invention relates generally to a card connector, and more particularly to a card connector alternatively receiving two cards.

2. Description of Related Arts

A SIM (Subscriber Identity Module) card connector is usually arranged on a mobile phone for indentifying a subscriber. According to multifunction of the mobile phone, minimization of the SIM card connector is more and more required. Nowadays, a mini-SIM card (25 mm*15 mm) is widely used. A micro-SIM card (15 mm*12 mm) has been developed by European Telecommunications Standards Institute in 2010. The mini-SIM card and the micro-SIM card will coexist in a few following years. The mini-SIM card and the micro-SIM card distinguish with each other merely by their sizes. Electrical pads of the two cards are same to each other and therefore it is possible for the two cards to be received in a same card connector.

The card connector comprises an insulative housing, a plurality of contacts retained in the insulative housing, a metal shell covering the insulative housing, and a pair of spring elements retained in the insulative housing and protruding towards the metal shell. In general, the micro-SIM card does not interfere with the spring elements because the micro-SIM card has a smaller width. Therefore, the insulative housing, the metal shell, and the spring elements cooperatively define a first space for receiving the micro-SIM card. The spring elements are pressed down by the mini-SIM card because the mini-SIM card has a larger width. Therefore, the insulative housing and the metal shell cooperatively define a second space for receiving the mini-SIM card. However, the narrow micro-SIM card may be falsely inserted below the spring elements if the spring elements excessively protrude into the second space. The spring elements may be damaged by the narrow micro-SIM card. Additionally, the spring elements are obstructive if the spring elements excessively protrude into the second space, resulting in that the mini-SIM card cannot be inserted in the second space.

Hence, a card connector smoothly and alternatively receiving two cards is desired.

SUMMARY OF THE INVENTION

Accordingly, an object of the present invention is to provide a card connector smoothly and alternatively receiving two cards.

To achieve the above object, a card connector includes an insulative housing, a number of contacts retained in the insulative housing, a metal shell covering the insulative housing for defining a first space, and a pair of spring elements associating with the insulative housing and the metal shell for defining a second space. The insulative housing defines a pair of cavities and having a flange extending into each cavity. The spring elements have fixing portions retained with the insulative housing, front and rear flexible beams oppositely extending from the fixing portions, and first, second, third, and fourth floating portions formed on respective distal ends of the front and rear flexible beams. The floating portions protrude into the first space. Each floating portion has a protrusion suspending below the flange.

Other objects, advantages and novel features of the invention will become more apparent from the following detailed description when taken in conjunction with the accompanying drawings.

DETAILED DESCRIPTION OF THE PREFERRED EMBODIMENT

Figure 1:
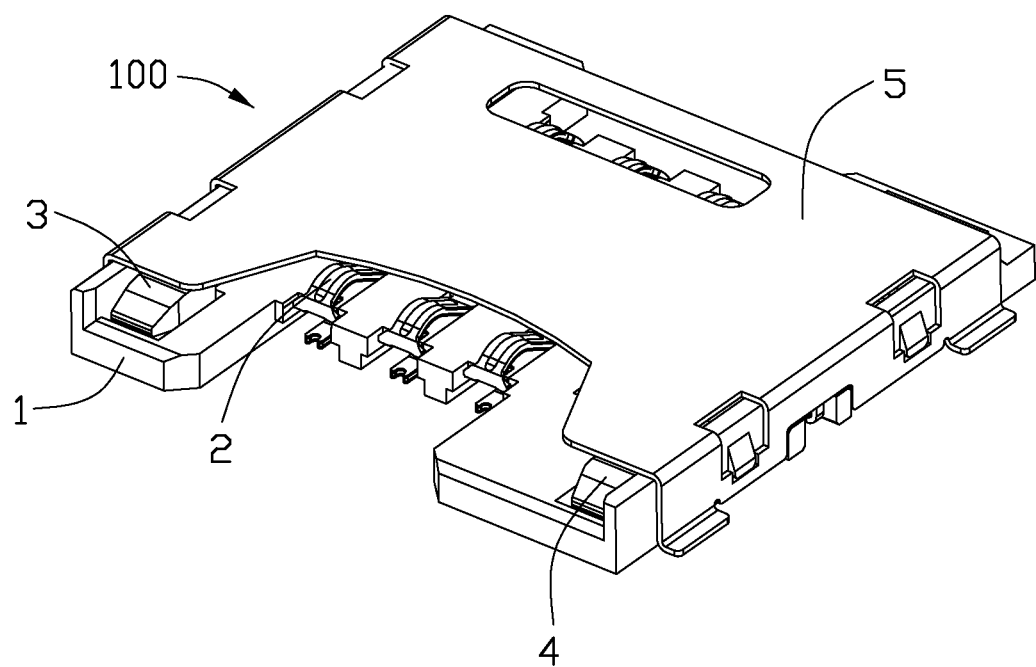
FIG. 1 is a perspective, assembled view of a card connector in a preferred embodiment of the present invention.
Figure 2:
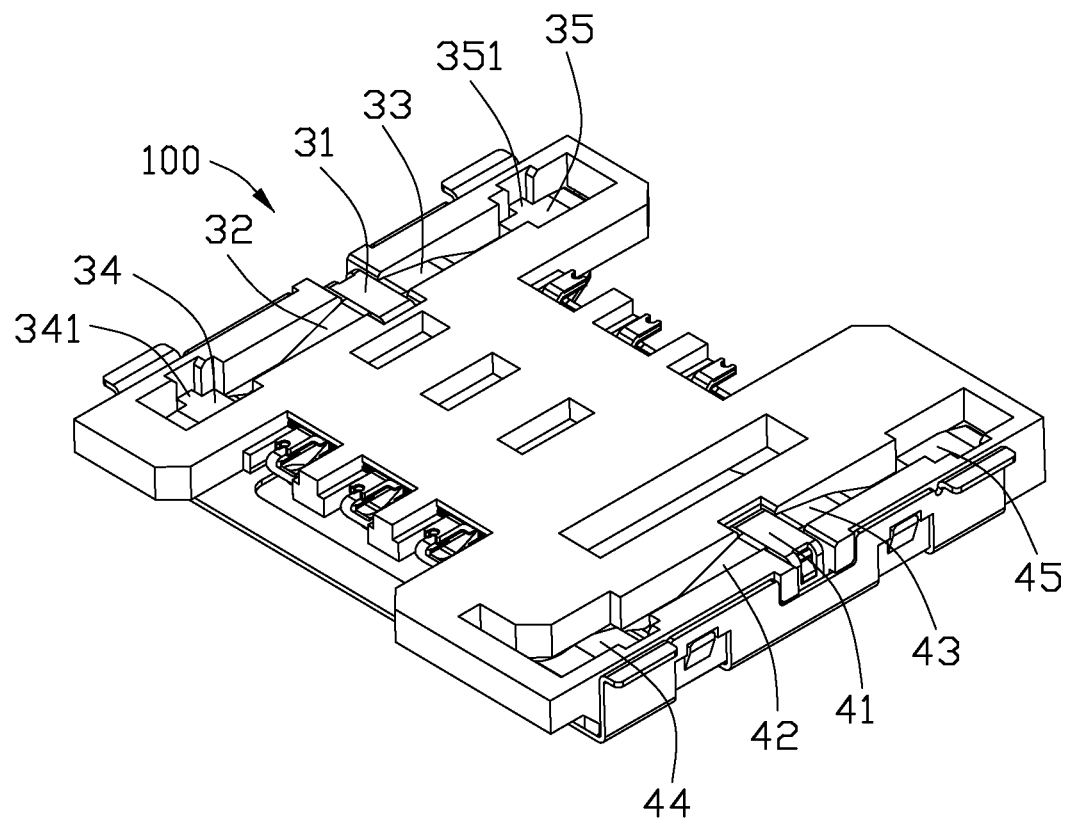
FIG. 2 is another perspective, assembled view of the card connector.

Reference will now be made in detail to the preferred embodiment of the present invention.

Referring to FIGS. 1-9, a card connector 100 in accordance with the present invention is used for alternatively receiving a first, wider mini-SIM card 81 and a second, narrower micro-SIM card 82. The mini-SIM card 81 and the micro-SIM card 82 distinguish with each other merely at their sizes. The two cards 81, 82 comprise a plurality of electrical pads 811, 821, which are same to each other.

Figure 4:
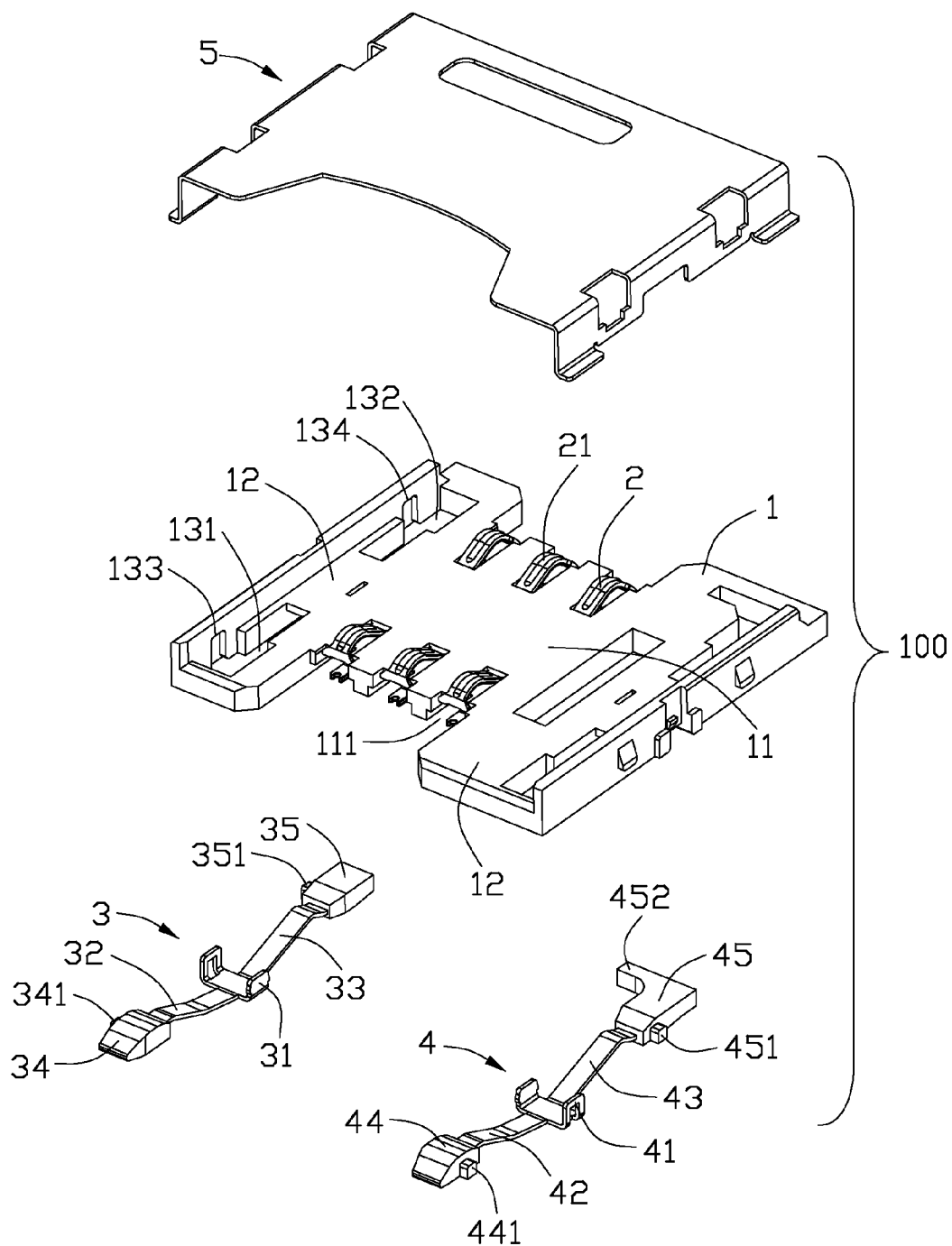
FIG. 4 is a perspective, fully exploded view of the card connector.
Figure 5:
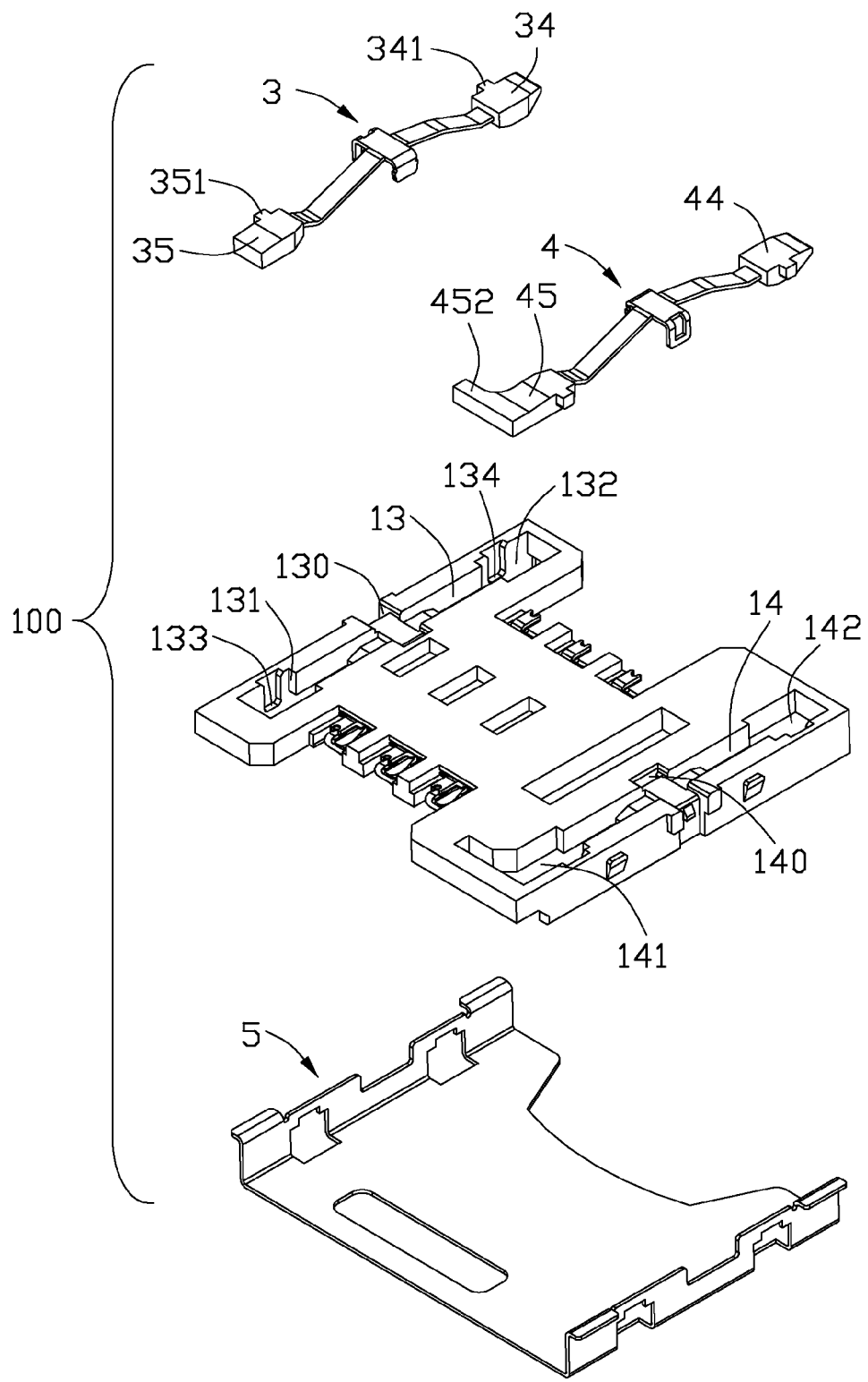
FIG. 5 is another perspective, fully exploded view of the card connector.

Referring to FIGS. 4 and 5, the card connector 100 comprises an insulative housing 1, a plurality of contacts 2 retained in the insulative housing 1, a first spring element 3 and a second spring element 4 retained in the insulative housing 1 too, and a metal shell 5 covering the insulative housing 1 for defining a first space (not labeled) for receiving the mini-SIM card 81. The first spring element 3 and the second spring element 4 are respectively positioned at two sides of the contacts 2 and both protrude into the first space.

Figure 3:
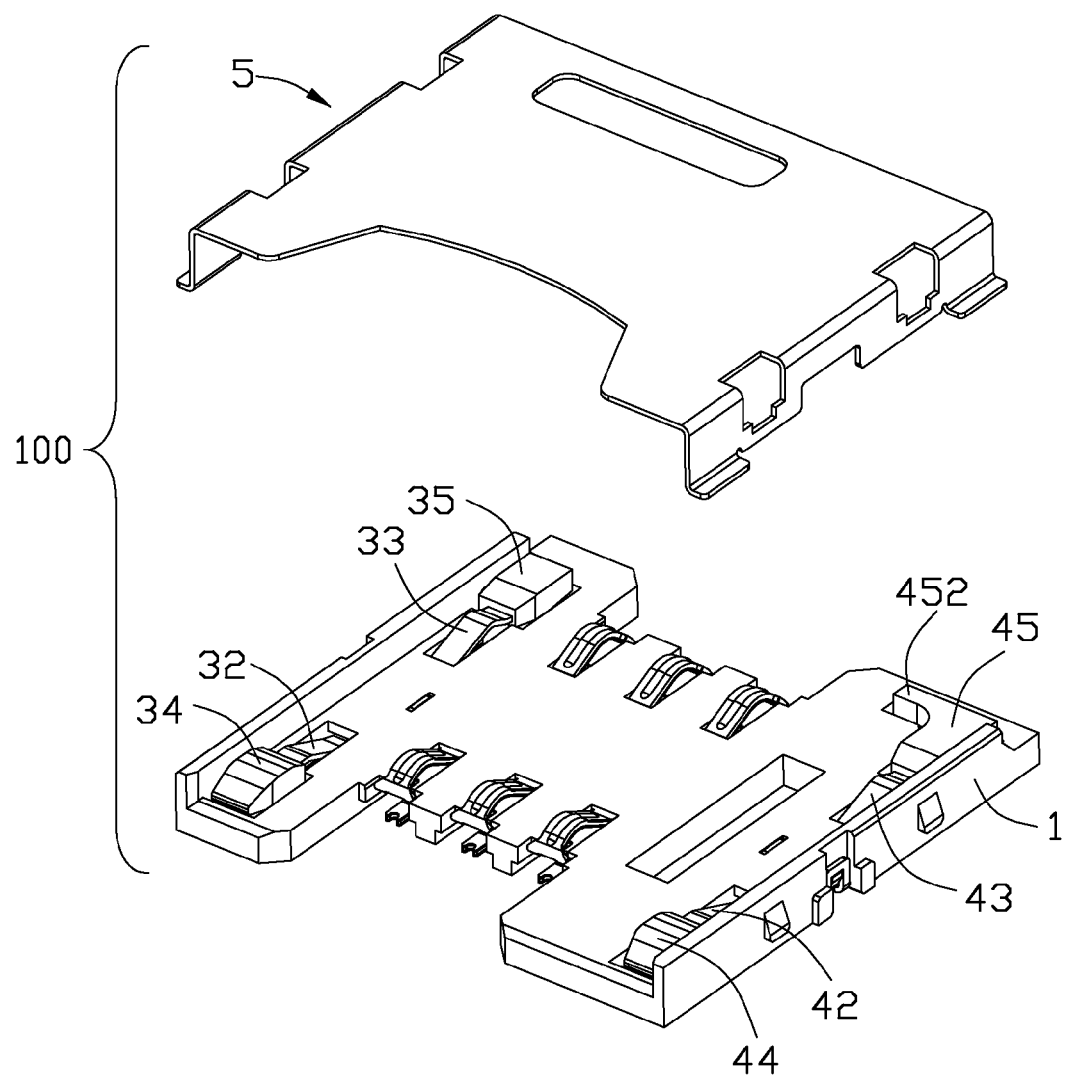
FIG. 3 is a perspective, partly assembled view of the card connector when a top cover is removed away from other parts of the card connector.

Referring to FIG. 3, the insulative housing 1 comprises a transverse portion 11 and a pair of longitudinal portions 12 perpendicular to the transverse portion 11. The transverse portion 11 defines a plurality of passageways 111 for retaining the contacts 2. The longitudinal portions 12 define a pair of cavities 13, 14 for retaining the first and second spring elements 3, 4. The cavities 13, 14 comprise a first cavity 13 and a second cavity 14 having a basically similar figure. The first cavity 13 comprises a first retaining channel 130 in the middle part of the left longitudinal portion 12 and first, second receiving channels 131, 132 respectively positioned at two sides of the first retaining channel 130. Similarly, the second cavity 14 comprises a second retaining channel 140 in the middle part of the right longitudinal portion 12 and third, fourth receiving channels 141, 142 respectively positioned at two sides of the second retaining channel 140. The insulative housing 10 further comprises first, second, third, and fourth flanges 133, 134, 143, 144 protruding into the corresponding first, second, third, and fourth receiving channels 131, 132, 141, 142.

Referring to FIGS. 3 and 4, the contacts 2 are retained in the passageways 111 of the insulative housing 1 along a mating direction. The contacts 2 have a plurality of contacting portions (not labeled) extending into the first space.

Figure 6:
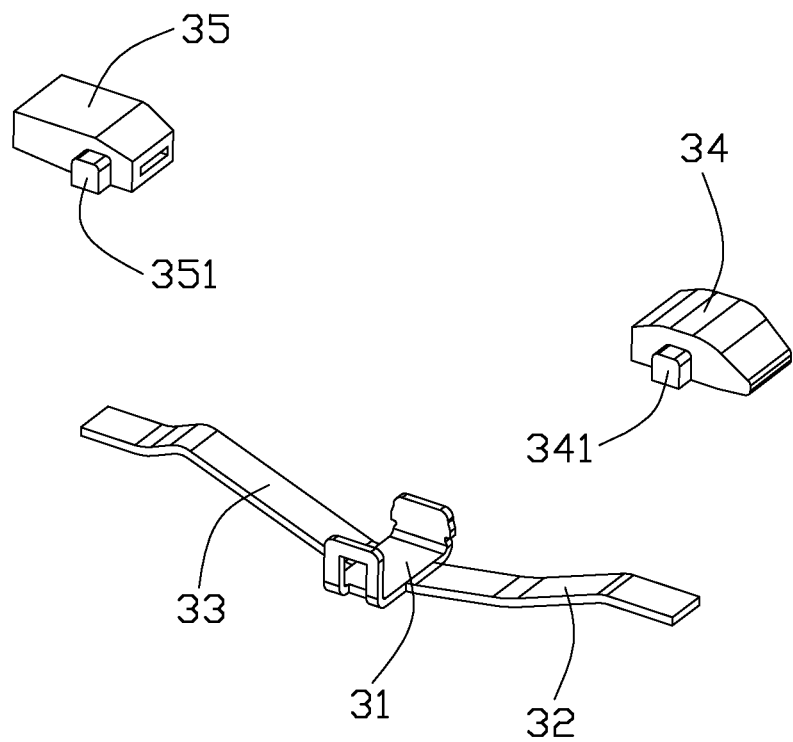
FIG. 6 is a perspective, exploded view of a spring element.

Referring to FIGS. 4-6, the first spring element 3 comprises a first fixing portion 31 to be retained in the first retaining channel 130, a front flexible beam 32 and a rear flexible beam 33 oppositely extending from the first fixing portion 31 to be correspondingly and respectively located upon the first receiving channel 131 and the second receiving channel 132, and a first floating portion 34 and a second floating portion 35 respectively formed at distal ends of the front flexible beam 32 and the rear flexible beam 33. The second spring element 4 has a figure similar to the first spring element 3. The second spring element 4 comprises a second fixing portion 41 to be retained in the second retaining channel 140, a front flexible beam 42 and a rear flexible beam 43 oppositely extending from the second fixing portion 41 to be correspondingly and respectively located upon the third receiving channel 141 and the fourth receiving channel 142, and a third floating portion 44 and a fourth floating portion 45 respectively formed at distal ends of the front flexible beam 42 and the rear flexible beam 43. The first and second fixing portions 31, 41 and the front and rear flexible beams 32, 33, 42, 43 are metallic. The first, second, third, and fourth floating portions 34, 35, 44, 45 are plastic.

Referring to FIGS. 3 and 4, the first, second, third, and fourth floating portions 34, 35, 44, 45 protrude into the first space when no card is inserted in the card connector 100. The insulative housing 1, the metal shell 5, and the first and second spring elements 3, 4 cooperatively define a second space (not labeled) for receiving the micro-SIM card. The second space is part of the first space, i.e., the second space has a same height but a smaller length and a smaller width compared to the first space. The contacting portions of the contacts 2 extend into the second space, too. The first, second, third, and fourth floating portions 34, 35, 44, 45 are respectively and correspondingly rotatable around the first and second fixing portions 31, 41 because the front flexible beam 32, 42 and the rear flexible beam 33, 43 are both elastic. Therefore, the first, second, third, and fourth floating portions 34, 35, 44, 45 are respectively and correspondingly moveable up-and-down in the first, second, third, and fourth receiving channel 131, 132, 133, 134. Each floating portion 34/35/44/45 forms a protrusion 341/351/441/451. The protrusions 341, 351, 441, 451 are respectively suspending below the first, second, third, and fourth flanges 133, 134, 143, 144 for preventing the first, second, third, and fourth the floating portions 34, 35, 44, 45 from excessively protruding into the first space. The fourth floating portion 45 further comprises a confining portion 452 laterally extending into the first space. The protrusions 341, 351, 441, 451 are plastic, too.

Figure 7:
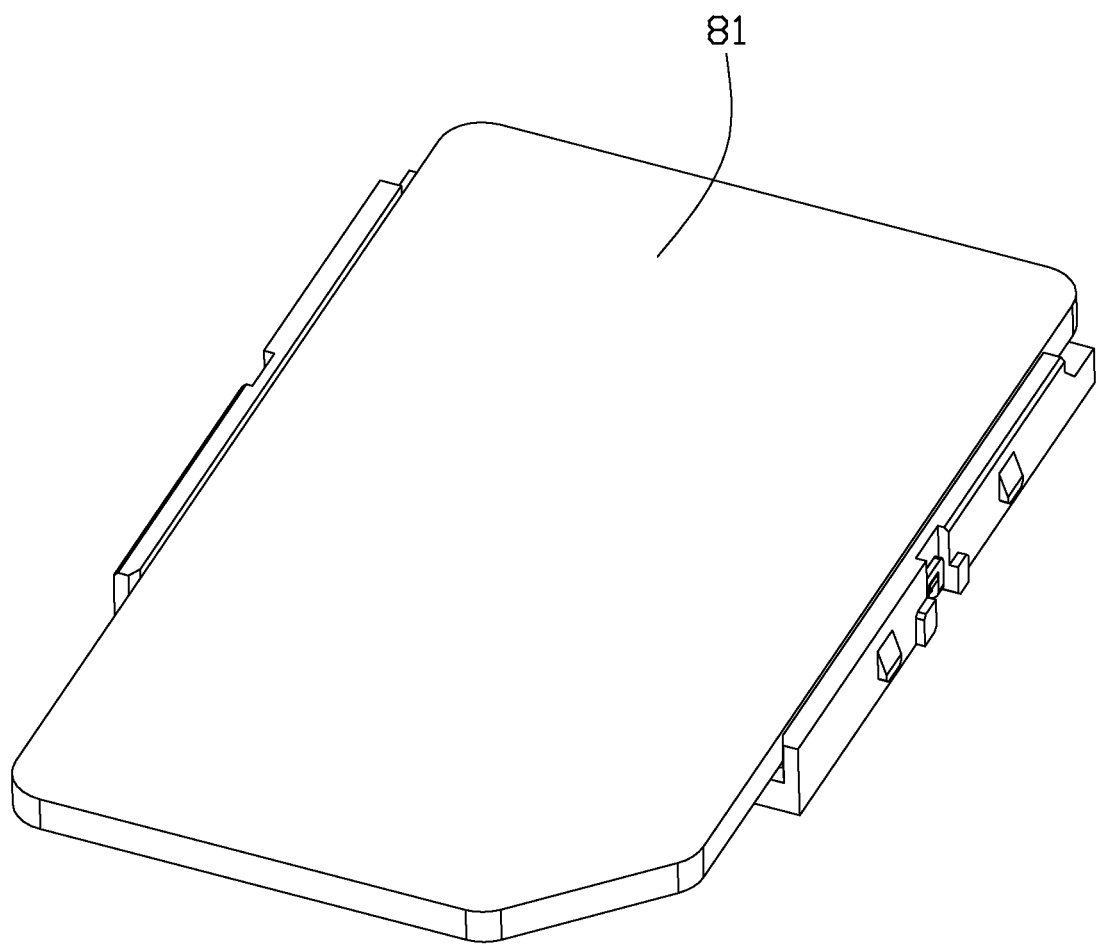
FIG. 7 is a perspective view when a mini-SIM card is inserted in the card connector and the top cover is not shown.

Referring to FIG. 7, when the mini-SIM card 81 is inserted, the first, second, third, and fourth floating portions 34, 35, 44, 45 of the first and second spring elements 3, 4 are pressed against by the mini-SIM card 81 and are wholly received in the first, second, third, and fourth receiving channels 131, 132, 141, 142. When the mini-SIM card 81 is fully inserted in the first space, electrical pads 811 of the mini-SIM card 81 are connected with contacting portions of the contacts 2 for electrical connection. Because the first, second, third, and fourth floating portions 34, 35, 44, 45 are plastic, short is prevented even if the first, second, third, and fourth floating portions 34, 35, 44, 45 of the first and second spring elements 3, 4 connect with bottom edge of the mini-SIM card 81. The protrusions 341, 351, 441, 451 are plastic for preventing damage to the insulative housing 1 when the protrusions 341, 351, 441, 451 are engaged with the first, second, third, and fourth flanges 133, 134, 143, 144.

Figure 8:
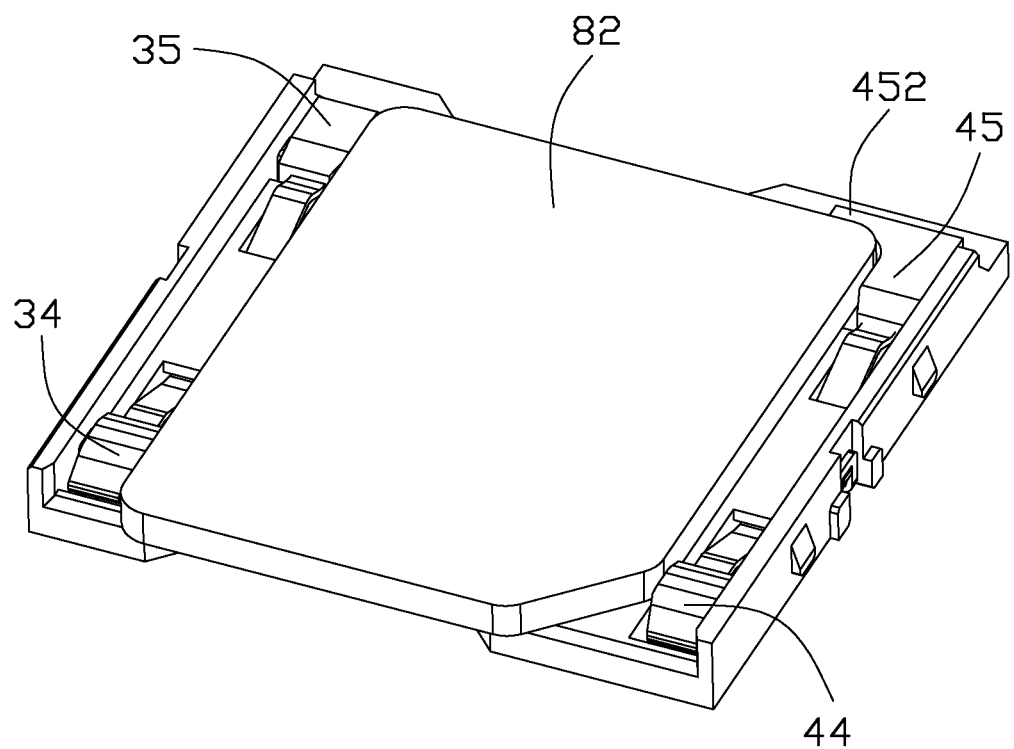
FIG. 8 is a perspective view when a micro-SIM card is inserted in the card connector and the top cover is not shown, too.
Figure 9:
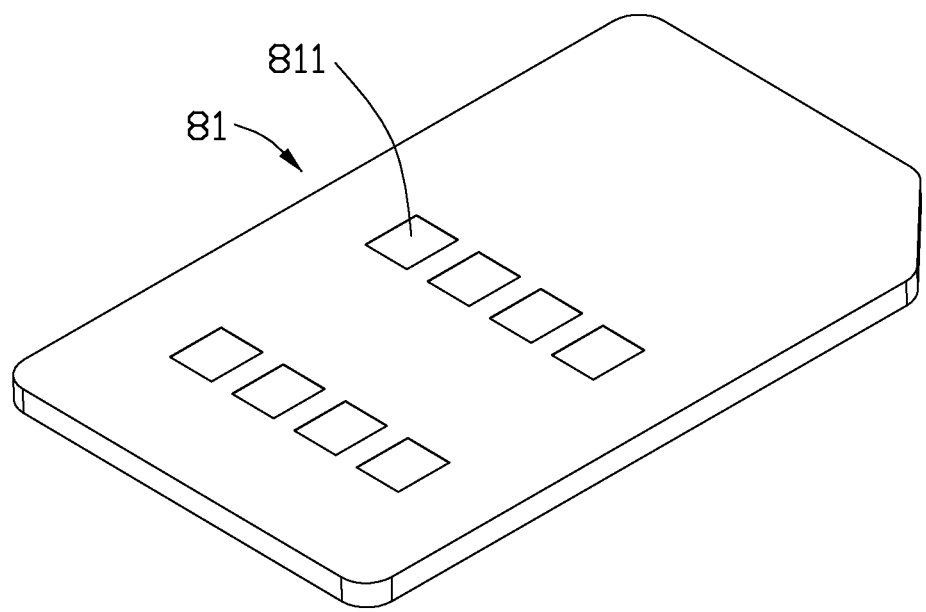
FIG. 9 is a perspective view of the min-SIM card and the micro-SIM card.
Figure 9:
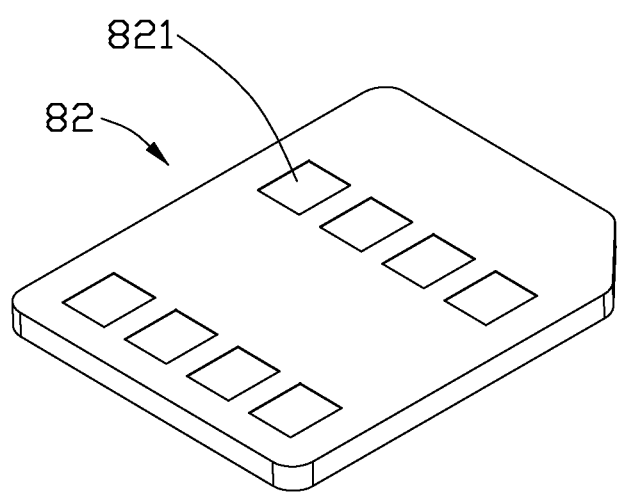

Referring to FIG. 8, when the micro-SIM card 82 is inserted, the first, second, third, and fourth floating portions 34, 35, 44, 45 of the first and second spring elements 3, 4 are not pressed against by the micro-SIM card 82 because the micro-SIM card 82 has a smaller width. When a rear edge of the micro-SIM card 82 contacts with the confining portion 452 of the fourth floating portion 45, the micro-SIM card 82 is fully inserted and therefore, electrical pads 821 of the micro-SIM card 82 are connected with contacting portions of the contacts 2 for electrical connection, too.

In the card connector 100 of the present invention, the protrusions 341, 351, 441, 451 are respectively suspending below the first, second, third, and fourth flanges 133, 134, 143, 144 for preventing the first, second, third, and fourth floating portions 34, 35, 44, 45 from excessively protruding into the first space. The protrusions 341, 351, 441, 451 are formed on each of the first, second, third, and fourth floating portions 34, 35, 44, 45 for balance purpose. Therefore, the narrow micro-SIM card 82 is prevented from being falsely inserted below the first and second spring elements 3, 4. The first and second spring elements 3, 4 are prevented from being damaged by the narrow micro-SIM card 82, too. Because the first and second spring elements 3, 4 are prevented from excessively protruding into the first space by the first, second, third, and fourth flanges 133, 134, 143, 144, the mini-SIM card 81 is not obstructed by the first and second spring elements 3, 4 and therefore, the mini-SIM card 81 is smoothly inserted in the first space.

While a preferred embodiment in accordance with the present invention has been shown and described, equivalent modifications and changes known to persons skilled in the art according to the spirit of the present invention are considered within the scope of the present invention as described in the appended claims.

What is claimed is:
1. A card connector, comprising:
an insulative housing defining a pair of cavities and having a flange extending into each cavity;
a plurality of contacts retained in the insulative housing;
a metal shell covering the insulative housing for defining a first space; and
a pair of spring elements associating with the insulative housing and the metal shell for defining a second space, the spring elements having fixing portions retained with the insulative housing, front and rear flexible beams oppositely extending from the fixing portions, and first, second, third, and fourth floating portions formed on respective distal ends of the front and rear flexible beams, the first, second, third, and fourth floating portions protruding into the first space, each of the first, second, third, and fourth floating portions having a protrusion suspending below the flange for preventing the first, second, third, and fourth floating portions from excessively protruding into the first space.
2. The card connector as claimed in claim 1, wherein the fixing portion and the flexible beam are metallic, and the floating portion is plastic.
3. The card connector as claimed in claim 2, wherein the protrusion is plastic.

4. The card connector as claimed in claim 1, wherein the fourth floating portion is formed on the rear flexible beam and comprises a confining portion laterally extending into the first space.

5. The card connector as claimed in claim 1, wherein the insulative housing comprises a transverse portion and a pair of longitudinal portions perpendicular to the transverse portion, and wherein the cavities are defined in the longitudinal portions.

6. The card connector as claimed in claim 5, wherein the contacts are retained in the transverse portion.

7. The card connector as claimed in claim 1, wherein the card connector alternatively receives a wider mini-SIM card and a narrower micro-SIM card.

8. The card connector as claimed in claim 7, wherein the mini-SIM card is received in the first space and the micro-SIM card is received in the second space.

9. The card connector as claimed in claim 8, wherein the second space is part of the first space and the second space has a same height but a smaller length and a smaller width compared to the first space.

* * * * *